Sept. 29, 1964 L. A. LUKE ETAL 3,151,318

AUTOMATIC GATE AND SENSE PREAMPLIFIER

Filed March 13, 1961 2 Sheets-Sheet 1

INVENTORS
LOUZELLE A. LUKE
WILLIAM M. OVERN
BY
Orrin M. Haugen
ATTORNEY

Sept. 29, 1964 L. A. LUKE ETAL 3,151,318

AUTOMATIC GATE AND SENSE PREAMPLIFIER

Filed March 13, 1961 2 Sheets-Sheet 2

INVENTORS
LOUZELLE A. LUKE
WILLIAM M. OVERN
BY
ATTORNEY

United States Patent Office 3,151,318
Patented Sept. 29, 1964

3,151,318
AUTOMATIC GATE AND SENSE PREAMPLIFIER

Louzelle A. Luke, Coon Rapids, and William M. Overn, St. Paul, Minn., assignors to Sperry Rand Corporation, New York, N.Y., a corporation of Delaware Filed Mar. 13, 1961, Ser. No. 95,428
7 Claims. (Cl. 340—174)

Figures 1, 2, 3:
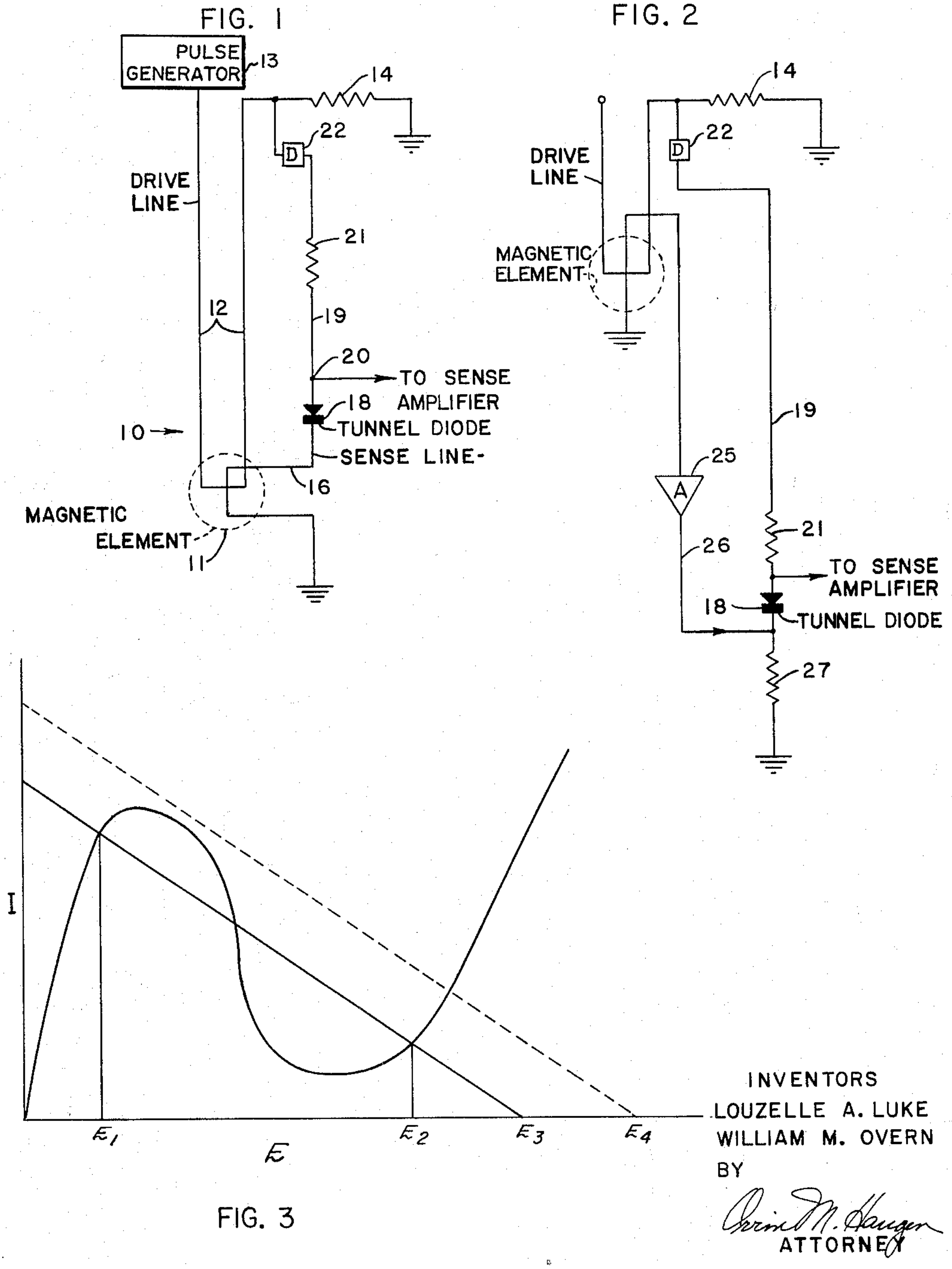

The present invention is concerned generally with a gated sense preamplifier arrangement for a coincident-current memory system and more particularly to an improved gating system utilizing a sense preamplifier wherein the gating operation is extremely reliable and extremely fast and is accomplished with a minimum of components.

In memory systems, particularly memory systems utilizing a bistable magnetic element for performing the memory function, it is essential to obtain a particular signal pulse from the memory element and apply this pulse to an appropriate amplifying network.

In magnetic memory systems generally, and particularly in such systems wherein an array of memory elements are employed, the signal obtained upon readout or interrogation is accompanied by a certain quantity of noise or stray pulses, the peak noise level normally preceding the signal output. In this connection, the noise level is at a reasonably high amplitude and unless extreme care is taken, such as in the use of a highly reliable gated amplifier, the noise may, in effect, disturb the output reading and contribute to unreliable performance. In a conventional binary system utilizing a bistable magnetic memory element, a binary "0" may arbitrarily be assigned to one state of remanent polarization in the memory element, and a binary "1" may be assigned to the opposite sense of remanent polarization. In order to read-out a system such as this, an interrogating signal pulse is applied to the memory element, the direction of field for the pulse being, for example, arbitrarily selected as in the binary "0" direction of remanence. The interrogation pulse is, of course, of sufficient magnitude to create a field which will switch the remanent state of the memory element if the remanent state lies in the binary "1" direction, and hence the signal achieved upon the change of the flux pattern is indicative of the original remanent state of the memory element. In order to utilize this signal, suitable detection means are required for sensing the signal indicating the previous remanent state of the memory element. Generally, conventional coincident-current memory systems utilize an output which is strobed or sampled at a specific time of maximum signal-to-noise ratio. In very high speed memory systems, time-strobing is difficult, if not impossible to perform because of the extremely short time period for the strobing action to take place. Thus, it becomes necessary to carefully gate the amplifier and sample the output signal during a certain period of the output cycle in order to prevent noise or other undesired transients which may be generated during the output cycle from being treated as a signal and transmitted to the output circuits. The gating is likewise difficult to achieve and develop because of the precise timing required, the transient pulses normally preceding a signal pulse by a period of substantially under 1 microsecond. In the past, it has been conventional to accomplish the gating operation by utilizing an auxiliary pulse source which is developed at a point in time immediately subsequent to the interrogation pulse.

While the gating operation may be performed utilizing conventional vacuum tubes or transistors, considerable time is required for rendering these components actively conductive subsequent to the application of a gating pulse thereto. In a transistor, for example, the capacitive effect between the emitter and collector may interpose a certain delay which, depending upon the immediately preceding operating history of the transistor, may be of an order of magnitude ranging from up to several hundred nano-seconds. Delays of even greater magnitude are encountered in connection with conventional vacuum tubes and the like. This delay is frequently a substantial portion of the operating time of a complete readout cycle and hence any reduction in this time period will reduce the overall operating time and correspondingly increase the speed of the computer system.

In accordance with the present invention, the gating operation is performed within a sense amplifier or preamplifier which comprises one or more tunnel diodes. A tunnel diode is a semiconductor diode which has a pair of spaced stable operating regions in one of the conducting directions, these stable regions being separated by a region which exhibits a negative resistance phenomena. For example, as the potential is increased from zero along a tunnel region, a first potential threshold is reached at which point a negative resistance region is reached, the negative resistance region continuing until a certain "valley potential" is reached, at which point the resistance again becomes positive and accordingly stable. The latter positive resistance region may be defined as a forward-conduction region. Inasmuch as the tunnel diode element requires but a pair of electrodes, the capacitive effects which are encountered in the vacuum or solid state triode are essentially eliminated. The operating time is accordingly exceedingly fast, this being in the pico-second region. The tunnel diode, while not capable of amplification in this circuit in the common sense of the term, performs a power transferring operation which is controllable. It is this function which may be referred to as "amplification" in the present case. Because of the fast operating speed of the tunnel diode, a replica of the interrogating pulse, delayed from the original readout pulse may be employed to "condition" the tunnel diode at a point immediately below the first threshold potential. The conditioning pulse is delayed so as to coexist at the tunnel diode with the sampled portion of the signal pulse, the sampling being at a certain pre-selected point in its cycle, where the signal-to-noise ratio is at an optimum high level. The period of the time delay is sufficient to permit noise generated on the sense line to die before sampling of the signal obtained from the storage element per se. In a system wherein a single readout element is utilized, there is essentially no delay required inasmuch as the response is relatively fast with regard to the overall operation of the system. On the other hand, however, in an assembly wherein the plurality of magnetic storage elements are being interrogated along a single line, particularly in a word and bit array, a delay is required because of the inherent noise generated during interrogation. The magnitude of the signal obtained from the memory element will be of a sufficient amplitude to cause the total potential applied to the system to define a load line which is beyond the first threshold level and accordingly will cause triggering of the element into operation along the second stable or normal operating range. For example, the threshold potential may be at a preselected level of, for example, 40 millivolts, while the second stable operating potential may be at a level of 400 millivolts. Inasmuch as the current available from the "conditioning" pulse is of relatively high magnitude, the total power transfer of the tunnel diode is at a fairly useful level. In other words, when the output of the sense line carries a signal having a predetermined amplitude, this signal may be sufficiently large to trigger the tunnel diode once the element has been "conditioned" by means of the delayed replica of the readout pulse. Once the tunnel diode has been "triggered" by means of the combination of the replica of the interrogation pulse and the signal pulse superimposed thereon, the element will continue to conduct in the normal conducting region so long as the replica pulse continues. Accordingly, the tunnel diode in this system functions as a pulse stretching component. The tunnel diode element is automatically reset when the replica current pulse is ultimately removed from the drive line, since no potential is being applied thereto. The arrangement considerably reduces any effect which noise generated upon interrogation may have on the system, the overall operation being exceedingly fast, accurate and reliable.

Therefore, it is an object of the present invention to provide an improved gate and sense preamplifier for reading-out memory systems, the operation being performed at an exceedingly rapid rate of speed.

It is further an object of the present invention to provide a readout system for a bistable magnetic storage element wherein a delayed replica version of the interrogation signal is employed as a gating current in a sense preamplifier.

It is yet a further object of the present invention to provide an improved readout system for memory systems wherein a delayed version of the interrogation pulse is utilized to condition a preamplifier system, and wherein the pulse obtained from the memory device per se is utilized to trigger the bistable amplifier device to the second stable state.

Figure 4:
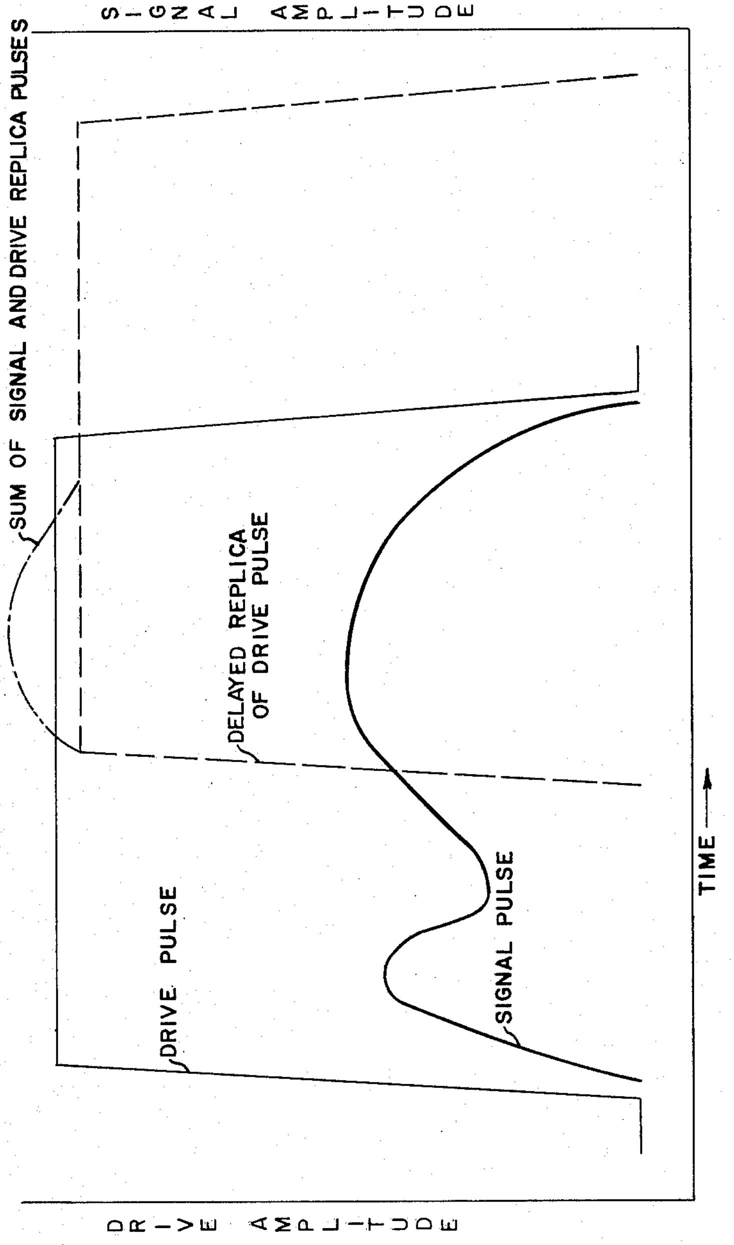

Other and further objects of the present invention will become apparent to those skilled in the art upon a study of the following specification, appended claims, and accompanying drawings, wherein, FIGURE 1 is a schematic circuit diagram illustrating the preferred modification of the gate and sense preamplifier system of the present invention, FIGURE 2 is a schematic circuit diagram of a somewhat modified form of a gate and sense preamplifier system prepared in accordance with the present invention, FIGURE 3 is a plot of the output characteristic of a system in accordance with the present invention employing a tunnel diode and illustrating a suitable load line for the impedance system used in conjunction therewith, and FIGURE 4 is a graph plotting time v. individual voltage amplitudes for the readout pulse, the signal pulse and the sum of the signal pulse and readout replica pulses.

In accordance with the preferred embodiment of the present invention, such as is illustrated schematically in FIGURE 1, the system generally designated 10 includes a magnetic memory element 11, a drive line 12, which provides the magnetic memory element 11 with interrogating pulses, the line 12 being connected between a suitable pulse source at 13 such as a well known electropulse model 2125B pulse generator and ground. Resistor 14 is connected between the memory element and ground. A sense line 16 is provided in the system, the sense line being disposed in a position whereby the magnetic flux from the element 11 may be inductively coupled to the sense line 16. The sense line is connected between ground and one terminal of the tunnel diode element 18. The other terminal of the tunnel diode element 18 is connected to line 19, which has its other terminal 20 operatively associated with the sense amplifier (not shown). Line 19 is further coupled to drive line 12 through resistor 21 and delay element 22.

The magnitude of the interrogation pulse utilized is adequate to modify the magnetic state existing in the bistable magnetic storage element and thereby provide a signal output, depending upon the pre-existing remanent state of the element. A signal output will occur only when the remanent state of the memory element is oriented along a direction which is anti-parallel to the direction of the field set up by the interrogating pulse. Should the remanent state of the element be substantially parallel to the field set up by the interrogating pulse, there will be no output signal from the system. However, in each case, noise generation will occur.

The resistance values of the resistors 14 and 21 are selected to have values which contribute to proper operation of the system and which define load lines compatible with the operating characteristics of the tunnel diode. Such a relationship is shown in FIGURE 3. Resistor 14 has a value which will establish a voltage drop thereacross which will be adequate to bias the tunnel diode to a certain value $E_1$ for the voltage applied thereto from the replica of the interrogation pulse, this value being $E_3$ which is immediately below the threshold value. The resistance value of resistor 21 must be sufficiently high to establish a load line through the first stable operating region of the tunnel diode for applied voltage $E_3$. Of course, it is appreciated that these values are reasonably correlated with the magnitude of the output current from the magnetic memory element.

With regard to the impedance means which are interposed in the conductor line 19, it may be stated that broadly speaking the resistor 21 together with the delay element 22 comprise a single source of electrical impedance. In certain cases, a sufficiently long lead line may be adequate to provide the required delay, this delay being equal to the transmission-time delay. In other instances, however, it may be essential to provide a signal delay component to accomplish the delay function. These delay elements are well known in the art and are commercially available today. The delay element 22 is selected to have an output which is delayed in time from the input, which is of sufficient duration to permit any noise generated along the sense line to subside before the switching signal of the storage element is sampled. Thus, the interrogating pulse carried along the drive line 12 will be seen at the diode 18 substantially coincidently with any readout signal obtained from the element 11 and carried along the sense line 16.

Relating these standards of operation to the graph shown in FIGURE 3, it will be seen that the replica of the drive pulse will carry the potential level applied to the tunnel diode to a point immediately below the threshold value at $E_1$. Substantially coincidently therewith, the signal pulse is seen at the diode and is of sufficient magnitude to trigger the element over to a second potential value such as at $E_2$, the total applied potential during the coexistent application of voltage being represented by the point $E_4$. The path of the plot of current vs. voltage for the tunnel diode will assume a level which is determined substantially by the load line represented by the solid line after the signal voltage is off and so long as the conditioning pulse remains, this voltage being represented by the intercept $E_2$. The slope of the load line is determined by the resistance value of resistor 21. Upon termination of the delayed drive pulse from tunnel diode 18, the applied potential level falls to zero, and the element is, in effect, reset for the next subsequent operating cycle. The shifting of the magnitude of voltage drop across the tunnel diode from a value $E_1$, to a value $E_2$ may be sensed by suitable external amplification means, not shown, and treated in accordance with the end application. These external amplification means are well known in the art.

With reference to FIGURE 4, the sequence of events along with the relative magnitude of individual pulses are graphically shown. Referring now to the plot of the signal pulse, it will be observed that a pair of peaks are shown, this plot being typical for a signal pulse which is obtained from a bistable magnetic storage element operating in a memory array. The first peak represents a noise portion and the second peak, which is somewhat longer in duration, represents the signal portion of the pulse. This, of course, only occurs when the magnetic storage element has previously been placed in a remanent state which is substantially opposite in polarity from that of the interrogating pulse. This may be of the remanent state which is arbitrarily defined as a binary "1" as set forth hereinabove. If, on the other hand, the remanent state is disposed substantially parallel to the direction of the interrogating field, as represented by a binary "0," the signal portion of the pulse will not occur and the system will not be triggered. It is the output signal portion representing a binary "1" coupled with the drive replica pulse which is used to trigger the tunnel diode from the tunnel region into the stable or forward conduction state. The portion of the graph which occurs subsequent to the termination of the signal pulse may be defined as the "pulse-stretching" portion of the operating cycle. Once the element has been triggered, and so long as the magnitude of voltage applied to the tunnel diode does not fall substantially below the "valley-potential," the element will continue to function in the normal operating region.

Reference is made to FIGURE 2 of the drawings wherein a sense preamplifier 25 is shown along the sense line 26. In order to properly load the system, an additional resistor 27 is required between the output of the amplifier 25 and ground. The other components of the system are identical to that shown in FIGURE 1, the only difference in the systems lying in the addition of a preamplifier to the sense line. It will be appreciated that the slope of the load line in a system such as shown in FIGURE 2 will depend upon the combined resistance value of resistors 21 and 27.

It is understood that suitable modifications may be made in the structure as disclosed provided such modifications come within the spirit and scope of the appended claims. Having now, therefore, fully illustrated and described our invention, what we claim to be new and desire to protect by Letters Patent is:

1. Signal detection and amplification means adapted to sense a certain information signal from an information storage element and comprising an amplifier, an information storage element, pulse means for applying an electrical interrogation pulse to said information storage element to derive a discrete delayed electrical information signal therefrom at a certain predetermined time subsequent to the application of said interrogation pulse, a first conductive path operatively coupling said storage element to said amplifier and being adapted to have said electrical signal induced therein, and a second conductive path coupling said pulse means to said amplifier, said information storage element comprising a bistable magnetic core having first and second stable states of remanent magnetization, said amplifier comprising asymmetrical conducting apparatus having two stable operating regions, the first stable operation region lying below a certain first threshold potential, the second stable operating region lying above a certain valley potential, and an unstable operation region of negative electrical resistance interposed between said threshold potential and said valley potential, said second conductive path including impedance means and time delay means and being adapted to deliver a portion of said pulse energy to said amplifier at a certain predetermined potential below said threshold potential, said time delay means being adapted to delay transfer of said portion of pulse energy to said amplifier for a period substantially equal to said predetermined time period, the magnitude of the sum of said pulse energy portion and said information signal applied to said amplifier means being greater than said first threshold potential.

2. In a signal detection and amplification apparatus adapted to sense a certain information signal from a bistable magnetic storage element and comprising a bistable magnetic storage element, having first and second stable states of remanent magnetization, first conductor means inductively coupled to said storage element for passing an interrogation pulse along said storage element, second conductor means inductively coupled to said storage element for detecting an information signal initiated in said element, and amplifier means operatively associated with said first and said second conductor means and arranged to sample said signal at a certain predetermined time following said interrogation pulse, said amplifier comprising asymmetrical conducting apparatus having two stable operating regions, the first stable operating region lying below a certain threshold potential, the second stable operating region lying above a certain second valley potential, and an unstable operating region of negative electrical resistance interposed between said threshold potential and said valley potential, said first conductive path including impedance means and time delay means and being adapted to deliver a portion of said pulse energy to said amplifier at a certain first predetermined potential and at a certain predetermined time following said interrogation pulse, the magnitude of said first predetermined potential being less than said threshold potential, and the magnitude of the sum of said pulse energy portion and said information signal simultaneously applied to said amplifier being greater than said first threshold potential.

3. The signal detection and amplification apparatus of claim 2 being further characterized in that the magnitude of said first predetermined potential is greater than said valley potential.

4. In a signal detection and amplification apparatus adapted to sense a certain information signal from a bistable magnetic storage element and comprising a bistable magnetic storage element, having first and second stable states of remanent magnetization, first conductor means inductively coupled to said storage element for passing an interrogation pulse along said storage element, second conductor means inductively coupled to said storage element for detecting an information signal initiated in said element, and amplifier means operatively associated with said first and said second conductor means and arranged to sample said signal at a certain predetermined time following said interrogation pulse, said amplifier comprising a semiconductor asymmetrical conducting diode having a negative resistance response region interposed between two stable operating regions in the forward conducting direction, the negative resistance region lying above a certain threshold potential and below a certain valley potential, said second conducting path including impedance means and time delay means and being adapted to deliver a portion of said pulse energy to said amplifier at a certain predetermined potential below said threshold potential, said time delay means being adapted to delay transfer of said pulse energy to same amplifier for a period substantially equal to a certain predetermined time period, the magnitude of the sum of said pulse energy portion and said information signal being greater than said first threshold potential.

5. In a signal detection and amplification apparatus adapted to sense a certain information signal from a bistable magnetic storage element comprising a bistable magnetic storage element, having first and second stable states of remanent magnetization, first conductor means inductively coupled to said storage element for inducing an interrogation pulse therein, second conductor means inductively coupled to said storage element for detecting flux changes therein, thereby being adapted to create a pulse signal in said second conductor means, amplifier means operatively associated with said first and said second conductor means, and resistive impedance means arranged along the pulse current path of said first conductor means for controlling the proportion of said interrogation current pulse to be carried along said first conductive means to said amplifier means, said amplifier comprising asymmetric conducting apparatus having first and second stable operating potential regions defining an operating potential region of negative resistance interposed between a first threshold potential and a valley potential, said second conductive path including impedance means adapted to deliver a portion of said pulse energy to said amplifier at a certain predetermined potential below said first threshold potential and time delay means adapted to delay transfer of said pulse energy portion to said amplifier for a certain predetermined time period, the magnitude of the sum of said pulse energy portion and said information signal being greater than said threshold potential.

6. The signal detection and amplification means set forth in claim 5 being further characterized in that said amplifier means comprises an asymmetrical conducting semiconductor diode.

7. For use with a bistable magnetic storage element, having first and second stable states of remanent magnetization, drive means for carrying an interrogate pulse, sense winding means for electrically indicating the remanent state of the element in response to the interrogate pulse, an output terminal, time delay means electrically coupling said drive means to said terminal for passing at least a portion of the interrogate pulse to the terminal after a predetermined time delay, and gating means including a semiconductive element exhibiting a negative resistance region between two positive resistance regions at first and second voltage values electrically associated with said terminal and said sense means and being adapted to be selectively placed in a certain positive resistance region and effectively shunt the delayed signal from the terminal, depending upon the sense means indication.

References Cited in the file of this patent

Publication I: RCA TN No. 438, 3 sheets, "Tunnel, Diode Logic Circuits for Electron Data Processing Systems," Jan. 9, 1961.

Publication II: Electronics, pages 59–61, "Design of Logic Circuits Using Thin Films and Tunnel Diodes," by Smay and Pohm, Sept. 15, 1961.